(12) United States Patent
Cha et al.

(10) Patent No.: US 7,236,759 B2
(45) Date of Patent: *Jun. 26, 2007

(54) METHOD FOR STEERING SMART ANTENNA BEAMS FOR A WLAN USING SIGNAL AND LINK QUALITY METRICS

(75) Inventors: Inhyok Cha, Melbourne, FL (US); Zheng Zhao, Plainsboro, NJ (US); Thomas Eric Gorsuch, Merritt Island, FL (US); Ross L. Lintelman, Indialantic, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 127 days.

This patent is subject to a terminal disclaimer.

(21) Appl. No.: 11/080,038

(22) Filed: Mar. 15, 2005

(65) Prior Publication Data

US 2005/0221837 A1 Oct. 6, 2005

Related U.S. Application Data

(60) Provisional application No. 60/553,902, filed on Mar. 17, 2004.

(51) Int. Cl.
H04B 1/06 (2006.01)

(52) U.S. Cl. .................. 455/275; 455/272; 455/277.1; 455/280; 455/562.1; 455/575.7; 342/154; 342/74

(58) Field of Classification Search ................ 455/272, 455/273, 275, 276.1, 277.1, 277.2, 279.1, 455/278.1, 424, 425, 436, 432, 446, 447, 455/452.1, 452.2, 456.5, 456.6, 561, 575.1, 455/550.1, 13.3, 25, 63.4, 67.11, 562.1, 101, 455/115.3, 134, 135, 161.3; 375/267, 227, 375/224, 299, 347, 146, 261, 298, 134, 137; 370/252, 329, 338, 334, 331, 330, 346, 335, 370/320, 328; 343/777, 776, 896; 342/74, 342/154, 81, 158, 359, 360, 423, 428, 430, 342/449

See application file for complete search history.

(56) References Cited

U.S. PATENT DOCUMENTS 3,846,799 A 11/1974 Gueguen .................... 343/833

(Continued)

OTHER PUBLICATIONS

Ohira et al., Electronically Steerable Passive Array Radiator Antennas for Low-Cost Analog Adaptive Beamforming, 0-7803-6345-0/00, 2000, IEEE.

Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

King, The Theory of Linear Antennas, pp. 622-637, Harvard University Press, Cambridge, Mass., 1956.

Lo et al., Antenna Handbook: Theory, Applications and Design, pp. 21-38, Van Nostrand Reinhold Co., New York, 1988.

Primary Examiner—Edward F. Urban
Assistant Examiner—Charles Chow
(74) Attorney, Agent, or Firm—Allen, Dyer, Doppelt, Milbrath & Gilchrist, P.A.

(57) ABSTRACT

An antenna steering algorithm for a smart antenna uses signal quality metrics and link quality metrics for selecting a preferred antenna beam. The link quality metrics supplement the signal quality metrics for improving the antenna steering decision. The link quality metrics are based on information available from existing counters operating in the media access control (MAC) layer. Separate estimates of the frame error rates in the receive links and in the transmit links are obtained. One estimate is the downlink quality metric (DLQM) and another estimate is the uplink quality metric (ULQM). Alternative link quality metrics are based on throughput and data rates of the exchanged data.

24 Claims, 7 Drawing Sheets

U.S. PATENT DOCUMENTS

| | | | |
|---|---|---|---|
| 5,164,942 A | 11/1992 | Kamerman et al. | 370/94.1 |
| 5,905,473 A | 5/1999 | Taenzer | 343/834 |
| 6,009,124 A * | 12/1999 | Smith et al. | 375/267 |
| 6,108,374 A * | 8/2000 | Balachandran et al. | 375/227 |
| 6,381,462 B1 * | 4/2002 | Charas | 455/452.2 |
| 6,563,858 B1 | 5/2003 | Fakatselis et al. | 375/148 |
| 6,792,290 B2 * | 9/2004 | Proctor et al. | 455/562.1 |
| 6,871,066 B1 * | 3/2005 | Khullar et al. | 455/423 |
| 2002/0009134 A1 * | 1/2002 | Fischel et al. | 375/224 |
| 2004/0009794 A1 | 1/2004 | Proctor, Jr. et al. | 455/575.7 |
| 2004/0053634 A1 * | 3/2004 | Gainey et al. | 455/522 |
| 2004/0114535 A1 * | 6/2004 | Hoffmann et al. | 370/252 |
| 2004/0179491 A1 * | 9/2004 | Hosomi | 370/329 |
| 2004/0224639 A1 * | 11/2004 | Melero | 455/67.11 |
| 2005/0136963 A1 | 6/2005 | Frank et al. | 455/522 |
| 2005/0206564 A1 | 9/2005 | Mao et al. | 342/377 |
| 2005/0215261 A1 * | 9/2005 | Cha et al. | 455/452.2 |
| 2005/0215262 A1 * | 9/2005 | Cha et al. | 455/452.2 |
| 2006/0025178 A1 * | 2/2006 | Tao et al. | 455/562.1 |

OTHER PUBLICATIONS

* cited by examiner

METHOD FOR STEERING SMART ANTENNA BEAMS FOR A WLAN USING SIGNAL AND LINK QUALITY METRICS

RELATED APPLICATION

This application claims the benefit of U.S. Provisional Application Ser. No. 60/553,902 filed Mar. 17, 2004, the entire contents of which are incorporated herein by reference.

FIELD OF THE INVENTION

The present invention relates to the field of wireless local area networks (WLANs), and more particularly, to an antenna steering algorithm for a smart antenna operating in a WLAN.

BACKGROUND OF THE INVENTION

Smart antenna technology is directed to antennas having the ability to change radio beam transmission and reception patterns to suit the environment within which radio communication systems operate. Smart antennas have the advantage of providing relatively high radio link gain without adding excessive cost or system complexity.

Smart antenna technology has been used in wireless communication systems for decades, and has recently been investigated for use in wireless local area networks (WLANs). In a WLAN, a client station (CS) is a device used by a mobile end user for communication with other stations within the same WLAN or with other entities outside of the WLAN. Central hubs that provide distribution services in WLANs are referred to as access points (APs). Access points are similar to base stations in wireless telecommunication systems.

A client station can be equipped with a smart antenna as well as an antenna steering algorithm that enables the antenna to switch electronically to a particular directional antenna beam. This enables the client station to communicate with its access point while achieving high performance.

Signal quality information, such as a received signal strength indicator (RSSI) or a signal-to-noise ratio (SNR), is typically used to determine or steer a preferred directional antenna beam. However, it is difficult to accurately measure signal quality information when the received signal includes undistorted signals plus random noise. In addition, the received signal itself may be distorted and directional interference may be added in the received signal. Consequently, signal quality information alone may not always be a reliable indicator of the quality of the radio link. This is especially true in radio environments that are rich with interference coming from other client stations and access points, or other types of noise and interference sources.

SUMMARY OF THE INVENTION

In view of the foregoing background, it is therefore an object of the present invention to provide a method for steering smart antenna beams in a wireless local area network (WLAN) while more accurately taking into account the quality of the radio links.

This and other objects, features, and advantages in accordance with the present invention are provided by a method for operating a client station in a wireless local area network (WLAN) communication system comprising an access point, with the client station comprising an antenna steering algorithm and a smart antenna responsive to the antenna steering algorithm for selecting one of a plurality of antenna beams. The method may comprise exchanging data with the access point using a first selected antenna beam, and calculating a quality metric of the exchanged data for the first antenna beam.

The calculating may comprise determining at least one link quality metric (LQM) of the exchanged data for the first antenna beam, determining a signal quality metric (SQM) of the exchanged data for the first antenna beam, and combining the at least one LQM and the SQM for calculating the first quality metric. The at least one LQM advantageously improves the antenna steering decision in addition to the SQM, particularly when the exchanged data may be distorted by random noise.

At least one second antenna beam is selected for exchanging data with the access point, and at least one second quality metric of the exchanged data is calculated for the at least one second antenna beam. The calculating comprises repeating the determining and combining for each second antenna beam.

The first quality metric is compared to the at least one second quality metric. A preferred antenna beam is selected from among the first antenna beam and the at least one second antenna beam for continuing to exchange data with the access point based upon the comparing.

The at least one LQM may be based upon at least one estimate of a frame error rate (FER) of the exchanged data for the corresponding antenna beam. The at least one LQM may comprise a downlink LQM and an uplink LQM. A weighting factor may also be used when combining the downlink LQM and the uplink LQM.

The client station may comprise a media access control (MAC) layer including a plurality of frame counters for estimating frame error rates of the exchanged data. A first set of counters may be used for determining the downlink LQM and a second set of counters may be used for determining the uplink LQM. The first set of counters comprises a ReceivedFragment Count counter, a MulticastFragmentCount counter, and a FCSErrorCount counter. The second set of counters comprises an ACKFailureCount counter and a TransmittedFrameCount counter.

As an alternative, the LQM may be based upon a transfer rate of the exchanged data for the corresponding antenna beam. The transfer may be defined by a throughput and/or a data rate of the exchanged data for the corresponding antenna beam.

The SQM may be based upon a received signal strength indicator (RSSI) of the exchanged data for the corresponding antenna beam. A weighting factor may also be used when combining the LQM and the SQM. The plurality of antenna beams may comprise a plurality of directional beams and an omni-directional beam. The WLAN may comprise an 802.11 WLAN.

Another aspect of the present invention is directed to a client station for operating in a WLAN communication system comprising an access point. The client station may comprise a switched beam antenna for generating a plurality of antenna beams, a beam switching unit coupled to the switched beam antenna for selecting one of the plurality of antenna beams, and a transceiver coupled to the beam switching unit for exchanging data with the access point via a selected antenna beam. An antenna steering algorithm module executes the above described antenna steering algorithm for selecting the antenna beams for exchanging data between the transceiver and the access point.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
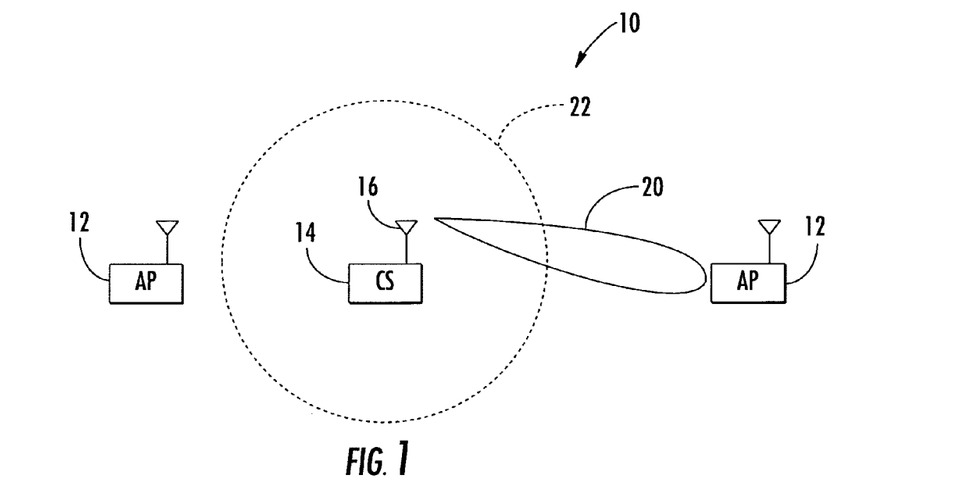
FIG. 1 is schematic diagram of an 802.11 wireless local area network (WLAN) including an access point, and a client station operating with a smart antenna in accordance with the present invention.
Figure 2:
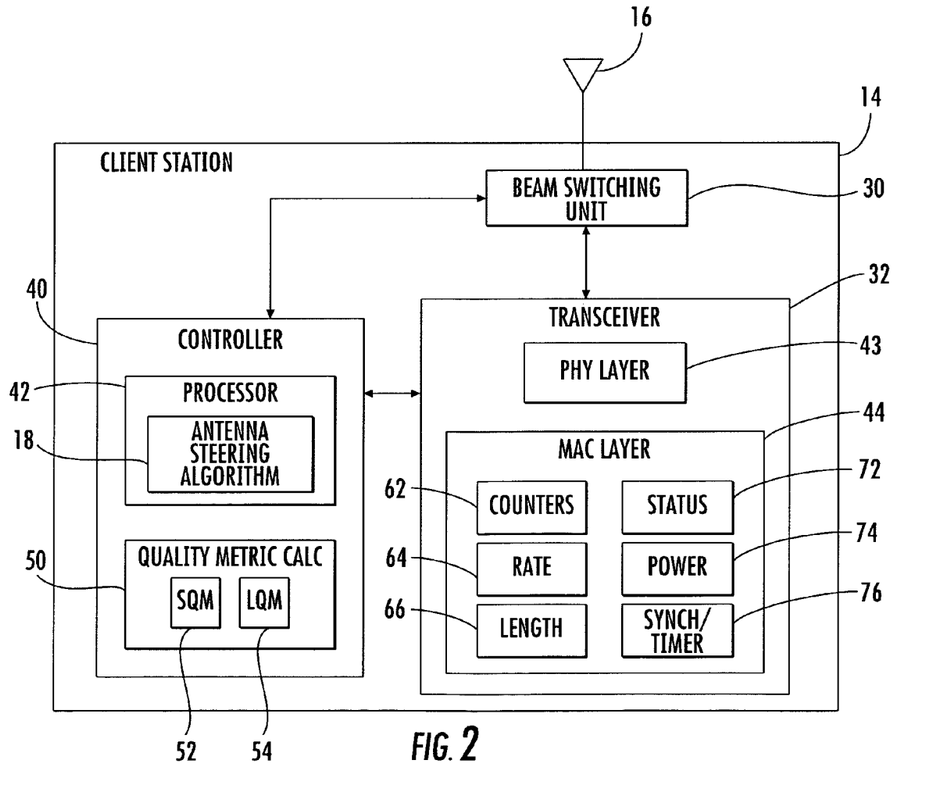
FIG. 2 is a block diagram of the client station illustrated in FIG. 1.

Referring initially to FIGS. 1 and 2, an 802.11 wireless local area network (WLAN) 10 includes an access point 12, and a client station 14 operating with a subscriber based smart antenna 16 in accordance with the present invention. The smart antenna 16, which will also be referred to as a switched beam antenna, generates a plurality of antenna beams in response to an antenna steering algorithm 18. The antenna beams generated by the smart antenna 16 include directional beams 20 and an omni-directional beam 22. The illustrated directional beam 20 is a switched beam for communicating with the access point 12.

The client station 14 includes a beam switching unit 30 connected to the smart antenna 16, and a transceiver 32 connected to the beam switching unit. A controller 40 is connected to the transceiver 32 and to the beam switching unit 30. The controller 40 includes a processor 42 for executing the antenna steering algorithm 18. Alternatively, the antenna steering algorithm 18 may operate on an 802.11 PHY/MAC chipset instead of the illustrated processor 42. The PHY/MAC chipset includes the illustrated PHY layer 43 and the MAC layer 44. Regardless of the processor executing the antenna steering algorithm 18, the algorithm utilizes information provided by what is typically called the upper MAC or MAC management portion of the MAC software, either via MAC abstraction available for access by the external host processor 42 or on the PHY/MAC chipset.

The use of directional antenna beams 20 improves the throughput of the WLAN 10 and increases the communication range between the access point 12 and the client station 14. A directional antenna beam 20 provides a high signal-to-noise ratio in most cases, thus allowing the link to operate at higher data rates. The PHY data rates for 802.11b links are 1, 2, 5.5, and 11 Mbps, and the rates for 802.11a are 6, 9, 12, 18, 24, 36, 48 and 54 Mbps. The 802.11g devices support the same data rates as 802.11a devices as well as the rates supported by 802.11b rates.

The antenna steering algorithm 18, as will be discussed in greater detail below, is for 802.11 WLAN client stations, especially those that support 802.11a or 80211g. The algorithm selects antenna beams based on computing and tracking of certain quality metrics obtained from the MAC layer management entity (MLME) and the physical layer management entity (PLME). Even though an 802.11 WLAN is discussed with respect to the antenna steering algorithm 18, the algorithm may be adapted to other types of local area networks, as readily appreciated by those skilled in the art.

Although the core logic of the algorithm will be common to an implementation on a PHY/MAC chipset or on the illustrated external host processor 42, there can be differences in performance of the antenna steering algorithm 18 depending on the type of implementation. For example, differences could exist between the two types of implementation regarding how fast some of the metrics can be computed, which could again result in differences in performance. The antenna steering algorithm 18, however, is designed with sufficient parametrization such that a single description can be applied to both types of implementation.

Figure 3:
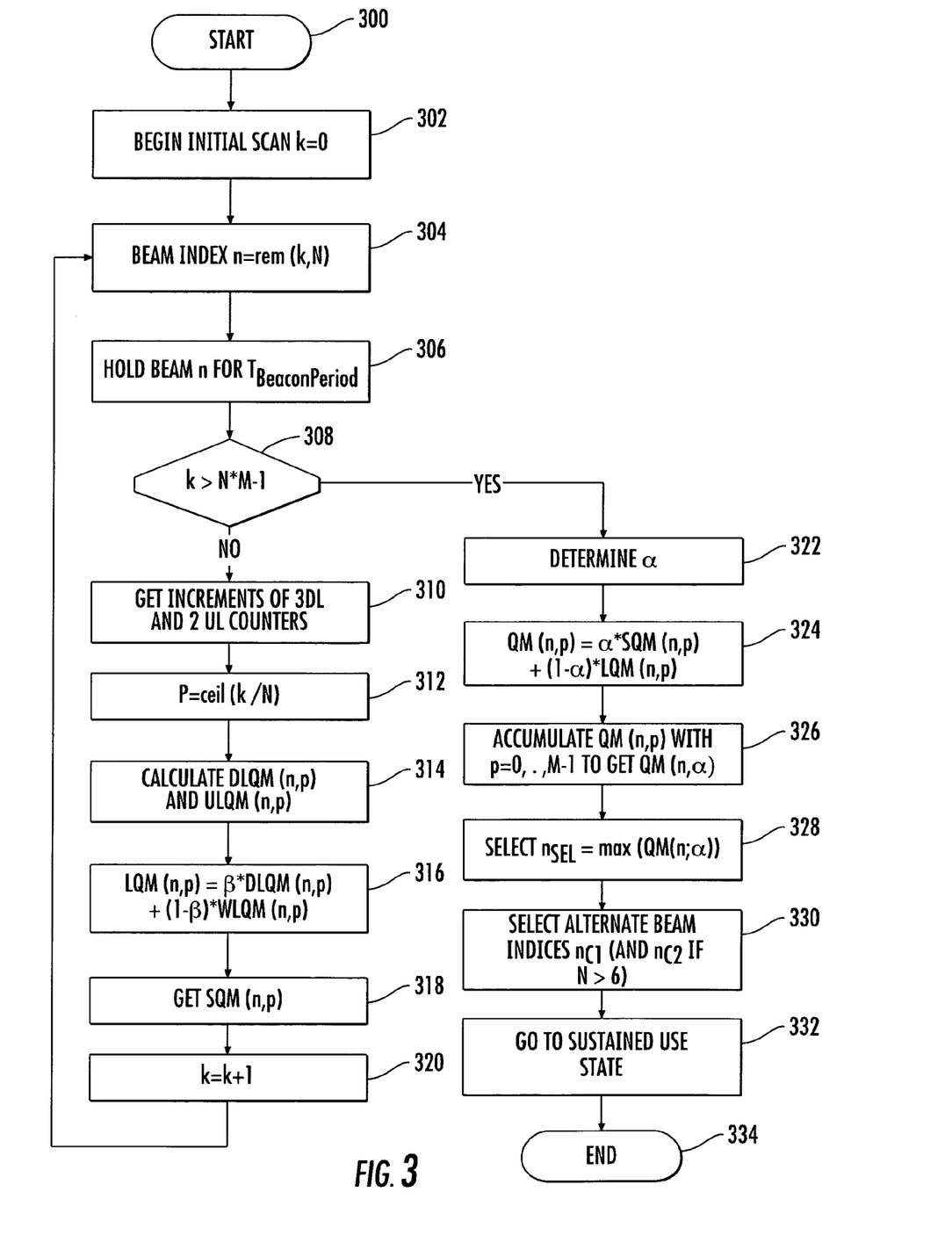
FIG. 3 is a flowchart for computing signal quality metrics (SQM) and link quality metrics (LQM) used in selecting antenna beams in accordance with the present invention.

Referring now to FIG. 3, quality metrics (QM) for selecting antenna beams for the smart antenna 16 are computed. The quality metrics are based upon signal quality metrics (SQM) and link quality metrics (LQM). For purposes of illustrating the present invention, the smart antenna 16 generates 6 directional beams 20 and 1 omni-directional beam 22 for a total of 7 antenna beams. Each directional beam 20 covers about 60 degrees in azimuth.

From the start (Block 300), an initial scan begins at Block 302. The variable k represents the current beacon period or time index. The beacon periods are provided by the access point 12, as readily appreciated by those skilled in the art. In the illustrated example, there are 10 beacon periods to accumulate the metrics for each antenna beam to be scanned. Metrics for only 1 antenna beam are determined per beacon period. Consequently, the flowchart loops through a total of 70 beacon periods for the 7 antenna beams, i.e., k ranges from 0 to 69.

After the quality metrics have been determined for each of the 10 beacon periods for each respective antenna beam, an average quality metric (QM) is determined by a quality metric calculator 50. As will be discussed in greater detail below, the quality metric calculator 50 includes a signal quality (SQ) module 52 for determining the signal quality metrics and a link quality (LQ) module 54 for determining the link quality metrics.

In Block 304, the antenna beam index n is set to the antenna beam being evaluated, i.e., n ranges from 1 to 7. The value of n is selected based upon the remainder of k/N, where N is the number of antenna patterns to be scanned (i.e., 7) and k is the current beacon period index. The antenna beam corresponding to the antenna beam index n determined at Block 304 is held for the beacon period $T_{BeaconPeriod}$ at Block 306.

The beacon period $T_{BeaconPeriod}$ is a periodic or quasi-periodic time interval that is typically on the order of 100 msec. In the decision Block 308, the current beacon period index k is compared to a number that is defined by N*M−1. Since N is the number of antenna patterns to scan (i.e., 7), and M is the number of beacon periods to accumulate the metrics (i.e., 10), k is compared to the number 69 for the illustrated example.

Each time the current beacon period index k is less than or equal to N*M−1 at Block 308, the method cycles through Blocks 310–318 for calculating the link quality metric (LQM) and for calculating the signal quality metric (SQM). The beacon period index k is then incremented by 1 at Block 320, and the method loops back to Block 304 for the next beacon period index n.

In one embodiment, the link quality metric is initially measured at the MAC layer 44 and is based upon the use of several counters 62 therein. The counters 62 are used to provide a MAC Frame Detection Ratio (MFDR), defined as (1−MFER), where MFER is the MAC frame error ratio.

The 802.11 MAC does not have provisions for determining the exact MFDR of all packets that were sent to a client station (downlink) or from a client station (uplink) solely by looking at the counters 62 that are standardized in the 802.11 MAC layer 44. Thus, it is not feasible to compute, for example, the exact downlink (access point 12 to client station 14) MFDR. However, there is a way to compute a metric that is related to the downlink MPDR and can be a useful metric for measuring downlink quality.

For example, some of the counters 62 that are defined in the 802.11 MAC Information Base (MIB) may be used to yield an estimate of the link quality in the downlink, i.e., the link that the client station 14 experiences in receiving packets from the access point 12. The MIB counters 62 of interest for downlink are dot11ReceivedFragmentCount, dot11MulticastFragment Count, and dot11FCSErrorCount.

The dot11ReceivedFragmentCount, which tracks the number of fragments received, is any received frame of type data or management of uni-cast type for the purpose of this counter. The steering algorithm 18 tracks the increment of this counter by Rx_Frag_Cnt(k) for the k-th Beacon period.

The dot11MulticastFragmentCount, which tracks the number of multi-cast fragments received, is any received frame of type data or management for the purpose of this counter. The steering algorithm 18 tracks the increment of this counter by Rx_Mult_Cnt(k) for the k-th Beacon period.

The dot11FCSErrorCount, which tracks the number of frames received, of any type, which resulted in an FCS error. This counter can also indicate the link condition of the BSS. The antenna steering algorithm 18 tracks the increment of this counter by Fcs_Err_Cnt(k) for the k-th Beacon period.

The downlink link quality measure (DLQM) is defined as:

$$DLQM = \frac{\sum_k FCS\_Err\_Cnt(k)}{\sum_k \left\{ \begin{array}{l} Rx\_Frag\_Cnt(k) + \\ Rx\_Mult\_Cnt(k) + \\ FCS\_Err\_Cnt(k) \end{array} \right\}} \qquad \text{Eq. 1}$$

The DLQM as defined in equation 1 still does not give the accurate frame error rate in the downlink because i) the denominator counts only uni-cast or multi-cast frames of management and data types, while the numerator counts packet losses due to FCS error of all types of frames, and ii) also the denominator does not distinguish the packet loss due to collision from pure FCS checksum error.

In fact, the DLQM may over-estimate the downlink frame error rate. However, if such limitations are taken into consideration, for example, by using a higher threshold value to determine acceptable FER performance than would be used if the DLQM were a more accurate estimator of the FER, the DLQM could still be a useful indicator of the downlink link quality.

Likewise, a measure of the uplink (client station 14 to access point 12) link quality could be obtained. The MLME counters 62 are dot11ACKFailure Count, and dot11TransmittedFrameCount. The dot11ACK Failure-Count tracks the number of failures in the downlink ACK reception in response to a data packet sent from the client station. The antenna steering algorithm 18 tracks the increment of this counter by Ack_Fail_Cnt(k) for the k-th Beacon period.

The dot11TransmittedFrameCount counts the total number of successful uplink frame transmissions. A running counter is defined as Tx_Frm_Cnt(k), where the latter tracks the increments of the MLME counter dot11TransmittedFrameCount during any k-th Beacon period.

By using the counter Ack_Fail_Cnt(k) and Tx_Frm_Cnt (K) an uplink link quality metric (ULQM) is obtained. This is an estimate of the uplink MAC Packet error rate (MPER) according to:

$$ULQM = \frac{\sum_k Ack\_Fail\_Cnt(k)}{\sum_k \{Tx\_Frm\_Cnt(k) + Ack\_Fail\_Cnt(k)\}} \qquad \text{Eq. 2}$$

As in the case of the DLQM (equation 1), the ULQM of equation 2 typically over-estimates the actual FCS checksum error rate in the uplink, since the ACK failures in the denominator could be from both collision and FCS checksum error at the access point 12. Still, with such limitations being considered, the ULQM is useful as a downlink quality measure.

The search for preferred antenna beams thus uses such estimates of the DLQM and the ULQM. When determining the link quality metric in Block 316 based upon the individual downlink and uplinks calculations from Block 314, a weighting factor $\beta$ is used. The weighting factor $\beta$ is less than 1, and is typically selected for emphasizing the downlink calculations over the uplink calculations, or vice-versa. The weighting factor $\beta$ is less than 1.

In Block 318 the signal quality metric is determined for the current n and k. Typically, the signal quality metric that is the most readily available from the PHY layer 43 at a driver level is the received signal strength indicator (RSSI). The RSSI is typically measured at the end of the PLCP header for each packet and is provided to the signal quality module 52.

The 802.11 standard defines the RSSI as strictly a relative quantity, i.e., RSSI is not a true measure of the received signal power at any point in the receiver. However, depending on the format and frequency of its availability, the RSSI can still be a useful metric on which to base the antenna steering algorithm 18. The RSSI will hold not only for reception but also for transmission, although to a lesser degree, since in the 802.11 WLAN the wireless physical channel is a shared media for both downlink and uplink. Of course, a signal-to-noise (SNR) ratio may also be used.

When the beacon period index k exceeds N*M−1 in Block 308, the method continues to Block 322 for determining a weighting factor α for the signal quality metric. The weighting factor α is less than 1, and is typically selected for emphasizing the link quality metric over the signal quality metric. The quality metric QM for each antenna beam index n and for each beacon period index k is calculated in Block 324. Since there are 10 quality metric calculations for each antenna beam, an average quality metric value is obtained in Block 326. Based upon the average quality metric value for each antenna beam, the antenna beam n with the highest value is selected in Block 328.

Candidate or alternate antenna beams are further selected in Block 330 based upon the quality metric values determined in Block 328. In other words, the antenna beam $n_{c1}$ with the second highest quality metric value is selected, as well as the antenna beam $n_{c2}$ with the third highest quality metric value. As a default, one of the alternate antenna beams is an omni-directional beam 22 if the preferred antenna beam is a directional beam 20. Once the preferred and alternate antenna beams have been selected, the system goes to a sustained use state or period in Block 332. In the sustained use state or period, the selected antenna beam is used at the client station 14 for both downlink and uplink, for all frames, in the next $P_{SU}$ presumed beacon periods, where $60 < P_{SU} < 6000$ and has a default value of 600. The method ends at Block 334.

The link quality metric is thus computed to augment and improve on the antenna steering decision in addition to the signal quality metric. The link quality metrics are based on information available from five existing counters operated in the 802.11 Media Access Control (MAC) processes. As noted in Block 304, two separate estimates of the frame error rates (FER) are obtained, one is the downlink quality metric (DLQM) and the other is the uplink quality metric (ULQM). The 802.11 WLAN media access control (MAC) layer management entity (MLME) provides the frame counters to estimate the DLQM and ULQM.

As an alternative to using the FER-based link quality metric, LENGTH (i.e., throughput) and RATE information provided by the MAC layer 44 may be used. The LENGTH and RATE information can be obtained from the 802.11 MAC layer 44 for each of the transmitted or received MAC frames. A RATE module 64 and a LENGTH module 64 are used to provide estimates of the MAC-layer transfer rates in both downlink (receive side) and uplink (transmit side). Such estimated transfer rates are computed from the LENGTH and RATE information per transmitted or received MAC frames over a period of time.

The antenna steering algorithm 18 has at least driver-level read access to $RATE_{TX}(m, k)$ within the MAC layer 44 that reports the RATE, in unit of Mbps, of the m-th received frame in the k-th presumed beacon period at the end of each of the k-th presumed beacon period within a reasonable latency. The RATE may also be computed in the uplink. The antenna steering algorithm 18 also has at least driver-level read access to $SIZE_{RX}(m, k)$ within the MAC layer 44 that reports the SIZE in bytes of the m-th received frame in the k-th presumed beacon period at the end of each of the k-th presumed beacon period within a reasonable latency.

Other aspects of the antenna steering algorithm 18 are directed to methods for performing a self-monitored re-scan and a periodic rescan. The self-monitored re-scan involves monitoring the currently selected antenna beam, whereas the periodic re-scan involves monitoring alternate antenna beams.

The self-monitored re-scan is performed by the antenna steering algorithm 18 during a sustained use period after having selected a preferred antenna beam. During a sustained use period, a re-scan of the other antenna beams is not performed. The antenna steering algorithm 18 periodically monitors a quality metric of the ongoing radio link provided by the preferred antenna beam. The quality metric is based upon a signal quality metric and a link quality metric. If the quality metric deteriorates below certain thresholds during the sustained use period, the steering algorithm 18 either swaps the preferred antenna beam with an alternate antenna beam or initiates a re-scan of the available antenna beams for selecting a new preferred antenna beam.

As stated above, during any sustained use period, if a self-monitored re-scan trigger event happens, the antenna steering 18 performs a self-monitored re-scan. During the sustained use period, a selected-pattern quality metric is computed from metric data from the $M_{SP}$ most recent presumed beacon periods and is evaluated at the end of every $M_{SP}/2$ presumed beacon periods. $M_{SP}$ is an even integer larger than 0 and smaller than 12 and has a default value of 6, for example.

The self-monitored re-scan trigger event is defined as an event where the current selected pattern quality metric takes on a value that is lower by some threshold values compared to the average value of the same metric in the last $M_{AVG}$ most recent previous evaluation periods. Depending on the amount that the selected-pattern quality metric drops comparatively with the average value, either the current selected pattern would be swapped with a candidate pattern identified earlier, or a re-scan of all N patterns will occur. Also, when a self-monitored re-scan occurs, the timer for the sequencing of periodic re-scan and the sustained use period is reset, and a new sustained use period of length $P_{SU}$ presumed beacon periods starts.

Figure 4:
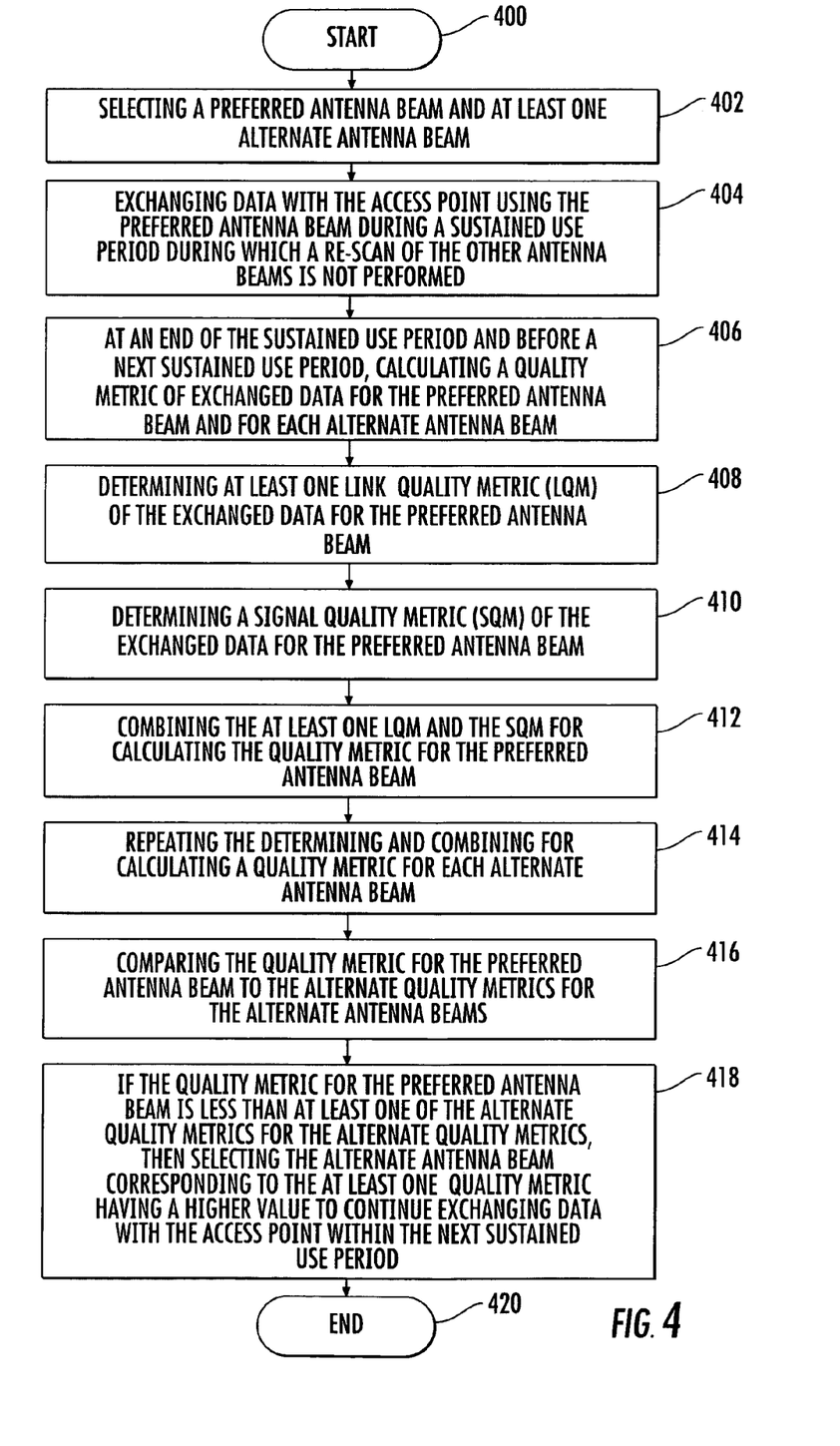
FIG. 4 is a flowchart for operating a smart antenna for a self-monitored re-scan in accordance with the present invention.

Referring now to FIG. 4, a flowchart for steering a smart antenna 16 using the self-monitored re-scan will be discussed. From the start (Block 400), a preferred antenna beam and an alternate antenna beam are selected at Block 402. Data is exchanged with the access point 12 at Block 404 using the preferred antenna beam during a sustained use period during which a re-scan of the other antenna beams is not performed.

During the sustained use period a quality metric of the exchanged data is periodically calculated at Block 406 for the preferred antenna beam. The calculating comprising determining at least one link quality metric (LQM) of the exchanged data for the preferred antenna beam at Block 408. A signal quality metric (SQM) of the exchanged data for the preferred antenna beam is determined at Block 410. The at least one LQM and the SQM are combined at Block 412 for calculating the quality metric. The quality metric for the preferred antenna beam is compared to a swap threshold range at Block 414.

The preferred antenna beam is swapped with the alternate antenna beam at Block 416 if the quality metric is within the swap threshold range to continue exchanging data with the access point 12 within the sustained use period. If the quality metric is not within the swap threshold range, then the quality metric is compared to a re-scan threshold at Block 418 for initiating a re-scan of the plurality of antenna beams for selecting a new preferred antenna beam. The method ends at Block 420.

The periodic re-scan is performed by the antenna steering algorithm 18 at an end of a sustained use period and before a next sustained use period. During a sustained use period, a re-scan of the other antenna beams is not performed. The periodic re-scan is performed on alternate antenna beams that were selected when the preferred antenna beam was selected.

The antenna steering algorithm 18 monitors a quality metric of the alternate antenna beams as well as a quality metric for the preferred antenna beam. If the quality metric of the preferred antenna beam is less than the quality metrics of anyone of the alternate antenna beams, then the alternate antenna beam corresponding to the quality metric having a higher value is selected for the next sustained use period.

As stated above, if a self-monitored re-scan does not take place during the preceding sustained-use period, a periodic re-scan takes place. A periodic re-scan decision metric is computed on the alternate antenna beams for $(N_C+1)*M$ presumed beacon periods, where $N_C$ is the number of candidate or alternate antenna beams. If the present selected antenna beam is omni-directional, then the remaining alternate antenna beams will be directional beams. If the switch beam antenna 16 has 7 antenna beams and the currently selected antenna beam is a directional antenna beam, then one of the alternate antenna beams will be the omni-directional beam 22 and the other alternate antenna beam will be a directional antenna beam 20.

During the periodic re-scan period, the antenna beams are scanned on all frames received or transmitted on all the alternate antenna beams. Subsequently, a decision on whether to replace or maintain the existing selected antenna beam will be made. A new sustained-use period of length $P_{SU}$ presumed beacon periods follows, after which another periodic re-scan takes place. This regular, periodic sequence of periodic re-scan and sustained use is continued, except when a self-monitored re-scan trigger event or a RSSI-drop induced re-scan takes place during the preceding sustained-use period.

Figure 5:
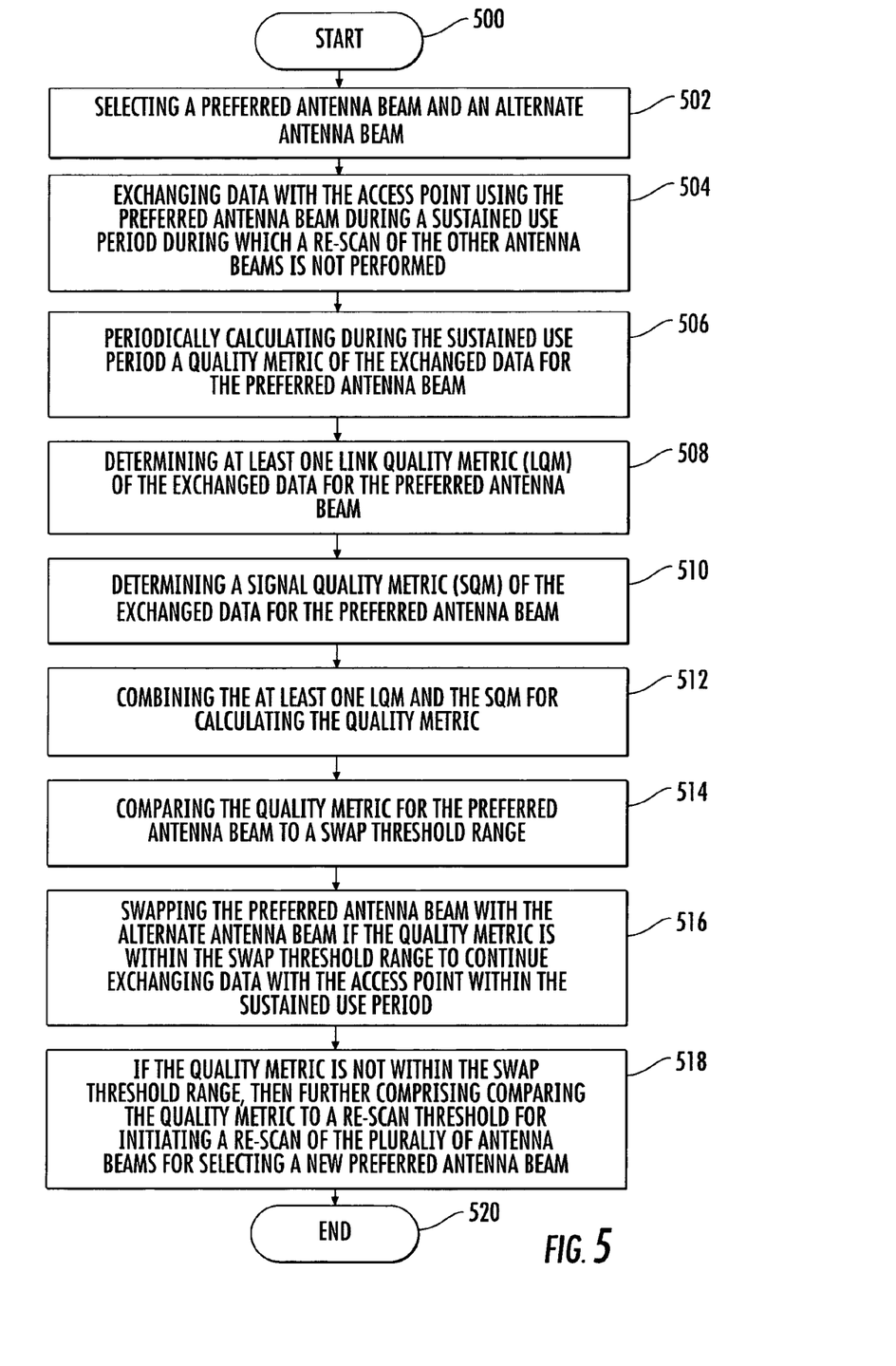
FIG. 5 is a flowchart for operating a smart antenna for a periodic re-scan in accordance with the present invention.

Referring now to FIG. 5, a flowchart for steering a smart antenna 16 using a periodic re-scan wil now be discussed. From the start (Block 500), a preferred antenna beam and at least one alternate antenna beam are selected at Block 502. Data is exchanged with the access point 12 at Block 504 using the preferred antenna beam during a sustained use period during which a re-scan of the other antenna beams is not performed.

At an end of the sustained use period and before a next sustained use period, a quality metric of exchanged data for the preferred antenna beam and for each alternate antenna beam is calculated at Block 506. The calculating comprises determining at least one link quality metric (LQM) of the exchanged data for the preferred antenna beam at Block 508. A signal quality metric (SQM) of the exchanged data for the preferred antenna beam is determined at Block 510. The at least one LQM and the SQM are combined at Block 512 for calculating the quality metric for the preferred antenna beam. The determining and combining are repeated at Block 514 for calculating a quality metric for each alternate antenna beam.

The quality metric for the preferred antenna beam is compared to the quality metrics for the alternate antenna beams at Block 516. If the quality metric for the preferred antenna beam is less than at least one of the quality metrics for the alternate antenna beams, then the alternate antenna beam corresponding to the at least one quality metric having a higher value is selected at Block 518 to continue exchanging data with the access point 12 within the next sustained use period. The method ends at Block 520.

Another aspect of the present invention is to operate the antenna steering algorithm 18 in response to three functions the MAC layer performs. The functions are notification of a change in the MAC_STATUS, MAC_PowerMode and Beacon Period Synchronization Information. The following modules within the MAC layer 44 are associated with these functions: Status 72, Power 74 and Synchronization 76.

The MAC_STATUS function 72 and the MAC_PowerMode 74 function notify the antenna steering algorithm 18 of changes in the MAC states within the MAC layer 44. The notification ensures that the MAC states are appropriate so that the antenna steering algorithm 18 will operate accordingly. The Beacon Period Synchronization Information 76 used by the MAC layer 44 allows the antenna steering algorithm 18 to maintain tight synchronization with the actual beacon periods.

The MAC layer 44 within the client station 14 communicates with the antenna steering algorithm 18 to decide antenna beam selection. During antenna beam selection periods, the main functions of the MAC layer 44 involve several MAC state machines, such as AuthreqService_Sta, AuthRspService_Sta, AsocService_Sta and Synchronization_Sta running in succession in the MAC layer 44 during the start-up time of the client station 14.

The antenna steering algorithm 18 itself just needs know the status of the MAC state machine on ready service or not, instead of the more detailed MAC functions and procedures. Thus, an abstracted status metric MAC_STATUS 72 is defined at the MAC layer 44 to compute the necessary abstracted information. When the value of the MAC_STATUS changes, the MAC layer 44 notifies the antenna steering algorithm 18 to verify the state of the MAC_STATUS 72. The MAC_STATUS metric is computed as provided in equation 3. The antenna steering algorithm 18 then responds to the changes in the MAC_STATUS state.

$$\text{MAC\_STATUS} \equiv \begin{cases} 0, \text{ if } S_{SYNCH}\_\text{STATUS AND } S_{ASSOCIATION}\_\text{STATUS} \\ \text{AND } S_{AUTH}\_\text{STATUS} = 0 \\ 1, \text{ if } S_{SYNCH}\_\text{STATUS AND } S_{ASSOCIATION}\_\text{STATUS} \\ \text{AND } S_{AUTH}\_\text{STATUS} = 1 \end{cases} \quad \text{Eq. 3}$$

Three different statuses of the MAC_STATUS 72 are monitored to synchronize the antenna beam selection functions and the MAC state machine. The three different statuses are $S_{SCANNING}$, $S_{AUTHENTICATION}$ and $S_{(RE) ASSOCIATION}$.

The $S_{SCANNINGN}\_$STATUS state indicates that the client station 14 has either successfully synchronized or unsynchronized to an access point 12. This status may also be termed as a BSS state. The status will be 1 if the client station 14 has passed the access point synchronization. Otherwise, the status will be 0.

From the 802.11 standards, all data frames will be undeliverable on both uplink and downlink if the MAC state machine runs out of the BSS state. In this case, the MAC layer 44 only receives the beacon frame, but rejects any application data frames. Therefore, the state of BSS is used as a condition to start the antenna beam selection.

The $S_{ASSOCIATION}\_$STATUS state indicates that the client station 14 has either successfully associated or un-associated to an access point 12. This status may also be termed as an assoc state. The status will be 1 if the client station 14 passes the access point association. Otherwise, the status will be 0.

The $S_{AUTH}\_$STATUS state indicates that the client station 14 has successfully passed either authentication or de-authentication. This status is termed as an auth_open state or an auth_key state in the 802.11 standards. The status will be 1 if the client station 14 has passed authentication. Otherwise, the status will be 0.

From the 802.11 standards, the authentication service is used by all client stations 14 to establish their identity to the access point 12 with which they will communicate. Two types of authentication service are open system and shared key. The open system authentication violates implicit assumptions made by higher network layers. The MAC layer 44 just verifies the MAC address. The shared key authentication requires implementation of the wired equivalent privacy (WEP) option, and the identity is demonstrated by knowledge of a shared, secret, WEP encryption key. Regardless of the type of authentication service to be used, a status result from authentication processing will be used as condition to start the antenna beam selection.

The authentication process may be time-consuming depending on the authentication protocol in use. The authentication service can be invoked independently of the association service. A client station 14 already associated with an access point (with which it previously authenticated) typically performs preauthentication. However, the 802.11 standards do not require client stations 14 to preauthenticate with access points 12, but authentication is required before an association can be established.

When all three management procedures, i.e., scan, authentication, and association are achieved, the MAC_STATUS 72 is set to 1. The MAC layer 44 then notifies the antenna steering algorithm 18 of the change. The antenna steering algorithm 18 then sets its SCAN_STATE to 1, i.e., during initial scan, and starts an initial scan procedure as described above. Also, subsequent operations of the antenna steering algorithm 18 take place, such as a sustained use period or different types of re-scans.

If any of the three status metrics become 0, the value of MAC_STATUS 72 changes to 0. This change is again notified from the MAC layer 44 to the antenna steering algorithm 18. The antenna steering algorithm 18 subsequently resets a currently selected antenna beam to a default antenna beam, such as the omni-directional antenna beam 22. The antenna steering algorithm 18 also resets its timers to right before the start of an initial scan, and resets its SCAN_STATE to 0, i.e., before initial scan or start-up.

Figure 6:
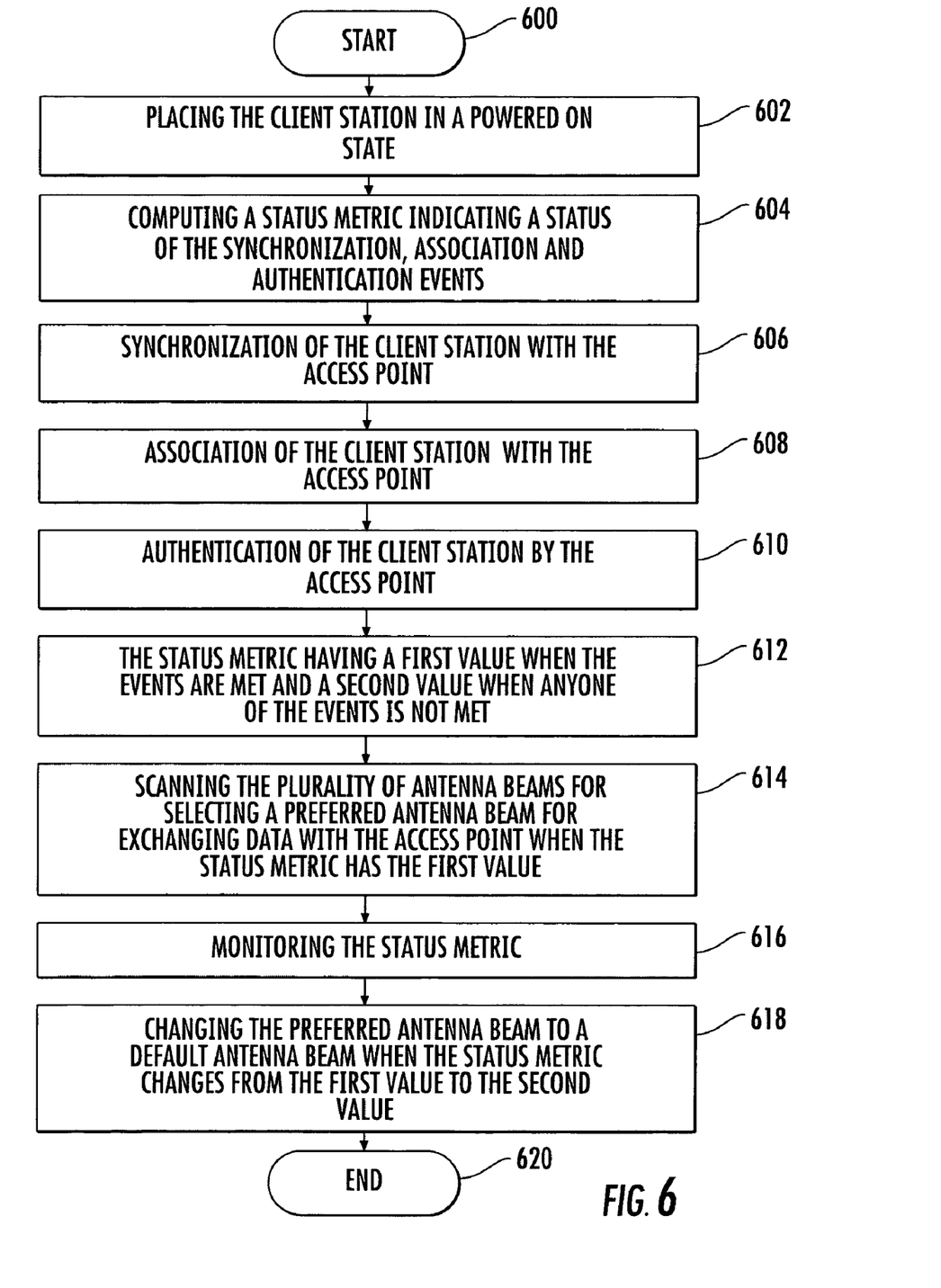
FIG. 6 is a flowchart for operating a smart antenna based upon a status metric provided by the MAC layer in accordance with the present ivention.

Referring to the flowchart illustrated in FIG. 6, selecting antenna beams by the antenna steering algorithm 18 in response to notification of a change of the MAC_STATUS 72 will now be discussed. From the start (Block 600), the client station 14 is placed in a powered on state at Block 602. A status metric 72 is computed at Block 604. The status metric 72 indicates a status of the following events: synchronization of the client station 14 with the access point 12, association of the client station with the access point, and authentication of the client station by the access point. The status metric 72 has a first value when the events are met and a second value when anyone of the events is not met.

The plurality of antenna beams are scanned at Block 614 for selecting a preferred antenna beam for exchanging data with the access point 12 when the status metric 72 has the first value. The status metric 72 is monitored at Block 616. The preferred antenna beam is changed to a default antenna beam at Block 618 when the status metric 72 changes from the first value to the second value. The method ends at Block 620.

The MAC layer also computes and maintains a power metric $S_{POWER\_}$STATUS 74. The value of $S_{POWER\_}$STATUS 74 is used in notification of a change in the power-saving mode status. The power metric 74 is updated by the MAC layer 44 via reading the MAC transmission coordination state machine (Tx-Coordination). Upon a change of the value of this metric, the MAC layer 44 notifies the antenna steering algorithm 18.

A state of the power metric $S_{POWER\_}$STATUS 74 indicates that the client station 14 has either wakened up or has been moved into a power save mode. This function is termed as a TxC_Idle state or an Asleep state in the 802.11 standard. The status will be 1 if the client station wakes up. Otherwise, the status will be 0. The power metric $S_{POWER\_}$STATUS 74 is computed as provided in equation 4.

$$S_{POWER\_}\text{STATUS} \equiv \begin{cases} 0, & \text{if } CS \text{ is in Power Save Mode,} \\ 1, & \text{if } CS \text{ is in Normal Power Mode} \end{cases} \quad \text{Eq. 4}$$

The Tx-Coordination state machine in the MAC layer 44 uses the state at all stations. The MAC layer 44 turns off both the transmitter and the receiver during the power saving mode, and the MAC layer ramps up the receiver power prior to the TBTT. The client station 14 retains its current power management mode until it informs the access point 12 via a successful frame exchange that it is going to wake up. The status of the power metric $S_{POWER\_}$STATUS 74 is used to instruct the antenna steering algorithm 18 to either resume a normal antenna steering operation or to turn off the operations.

In particular, if the power metric $S_{POWER\_}$STATUS 74 changes from 1 to 0, i.e., the client station 14 goes into a power saving mode, then the antenna steering algorithm 18 saves the indices for the current selected antenna beam and any alternate antenna beam. The antenna steering algorithm 18 also resets its timer to the end of a sustained use period or to the start of a new periodic re-scan, and then sets its SCAN_STATE, and notifies the MAC layer 44 on the completion of these procedures. If the power metric $S_{POWER\_}$STATUS 74 changes from 0 to 1, i.e., the antenna steering algorithm 18 immediately performs the periodic re-scan using the last saved selected antenna beam and the alternate antenna beam.

Figure 7:
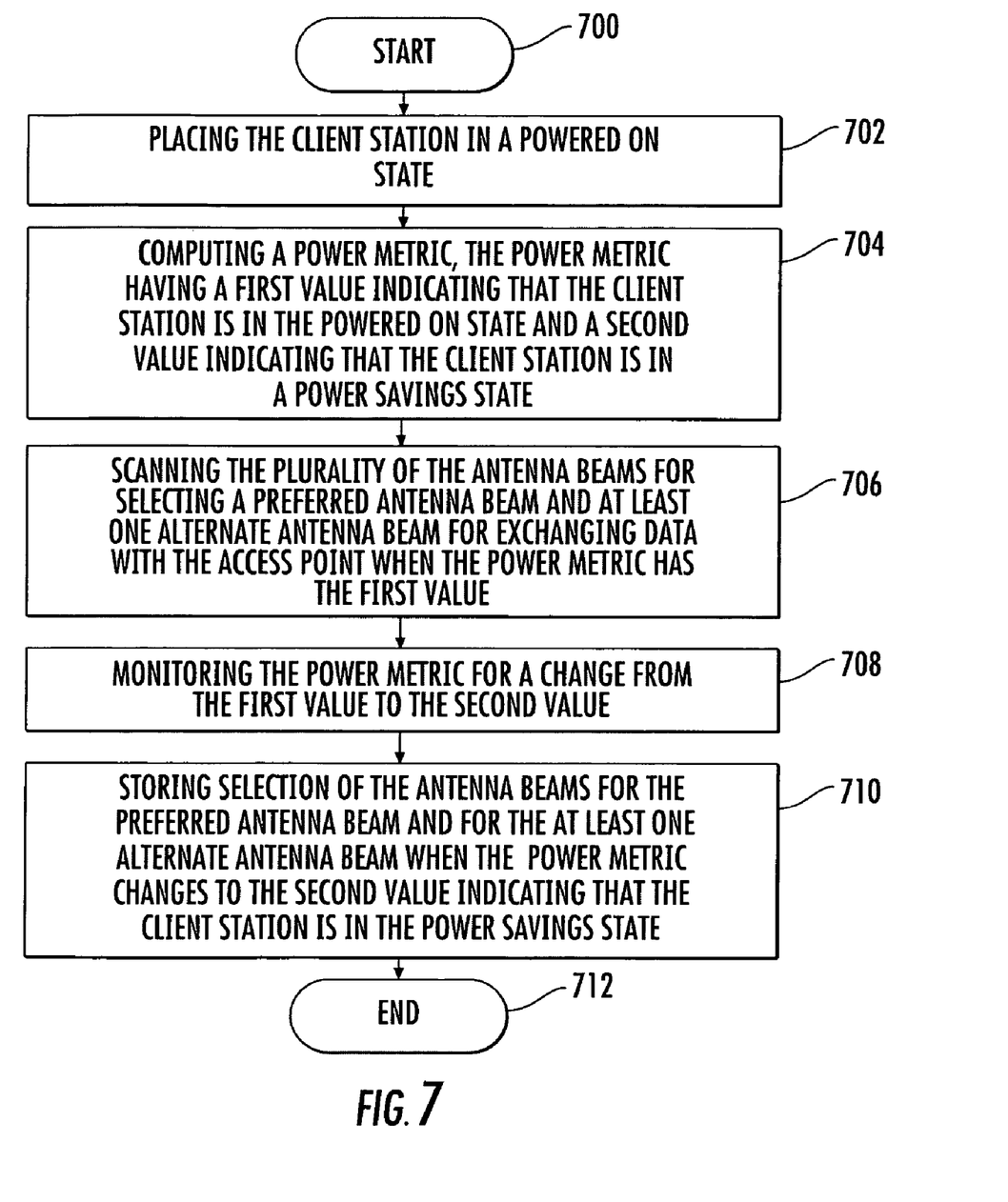
FIG. 7 is a flowchart for operating a smart antenna based upon a power metric provided by the MAC layer in accordance with the present ivention.

Referring to the flowchart illustrated in FIG. 7, selecting antenna beams by the antenna steering algorithm in response to notification of a change of the $S_{POWER\_}$ STATUS 74 will now be discussed. From the start (Block 700), the client station 14 is placed in a powered on state at Block 702. A power metric 74 is computed at Block 704. The power metric 74 has a first value indicating that the client station 14 is in the powered on state, and a second value indicating that the client station is in a power savings state.

The plurality of antenna beams are scanned at Block 706 for selecting a preferred antenna beam and at least one alternate antenna beam for exchanging data with the access point 12 when the power metric 74 has the first value. The power metric 74 is monitored at Block 708 for a change from the first value to the second value. At Block 710, selections of the antenna beams are stored for the preferred antenna beam and for the at least one alternate antenna beam when the power metric 74 changes to the second value indicating that the client station 14 is in the power savings state. The method ends at Block 712.

A Beacon Period Synchronization Information Timer metric $T_{bcn}$ 14 is also defined, computed and maintained at the antenna steering algorithm 18 to better synchronize its timing with the actual timer of the MAC layer 44, and resultantly, to have better synchronization of the presumed beacon period of the antenna steering algorithm with the actual beacon periods.

The Beacon Period Information Time Metric $T_{bcn}$ 76 is a counter that tracks the presumed beacon interval of the antenna steering algorithm 18. When this counter reaches a certain pre-specified number, the antenna algorithm 18 queries the MAC layer 44 and fetches the value of the MAC TSF. The antenna steering algorithm 18 can then use the fetched MAC timer value to update its own timer. This timer is used in the antenna steering algorithm 18 to align the searching time with the beacon period.

The antenna steering algorithm 18 updates synchronization to the actual beacon periods periodically, instead of during each beacon period. In-between the updating periods, the antenna steering algorithm 18 maintains a timer for the presumed beacon period interval, and runs the timer for each beam searching period. The antenna steering algorithm 18 updates the boundary of the presumed beacon period when it receives an update input from the MAC layer 44. On the k-th presumed beacon period, the timer value for the current presumed beacon period is computed as provided in equation 5.

$$T_{BCN}(k) \equiv \begin{cases} 0, \text{ if } k = rem(k, M \cdot TU) \neq 0 \\ BeaconPeriod \text{(integer)}, \text{ if } k = rem(k, M \cdot TU) = 0 \end{cases} \quad \text{Eq. 5}$$

The M*TU value is a number chosen to signify the length of time that the timer of the antenna steering algorithm 18 can operate without being updated by the MAC timer. The rem(x, y) is a remainder of integer x when divided by integer y. The TU is a time unit whose length is 1024 μs. Since TBTT is usually 100 TU (100 msec), M should be at least a multiple of 100, such as 500 or 1000, for example.

Figure 8:
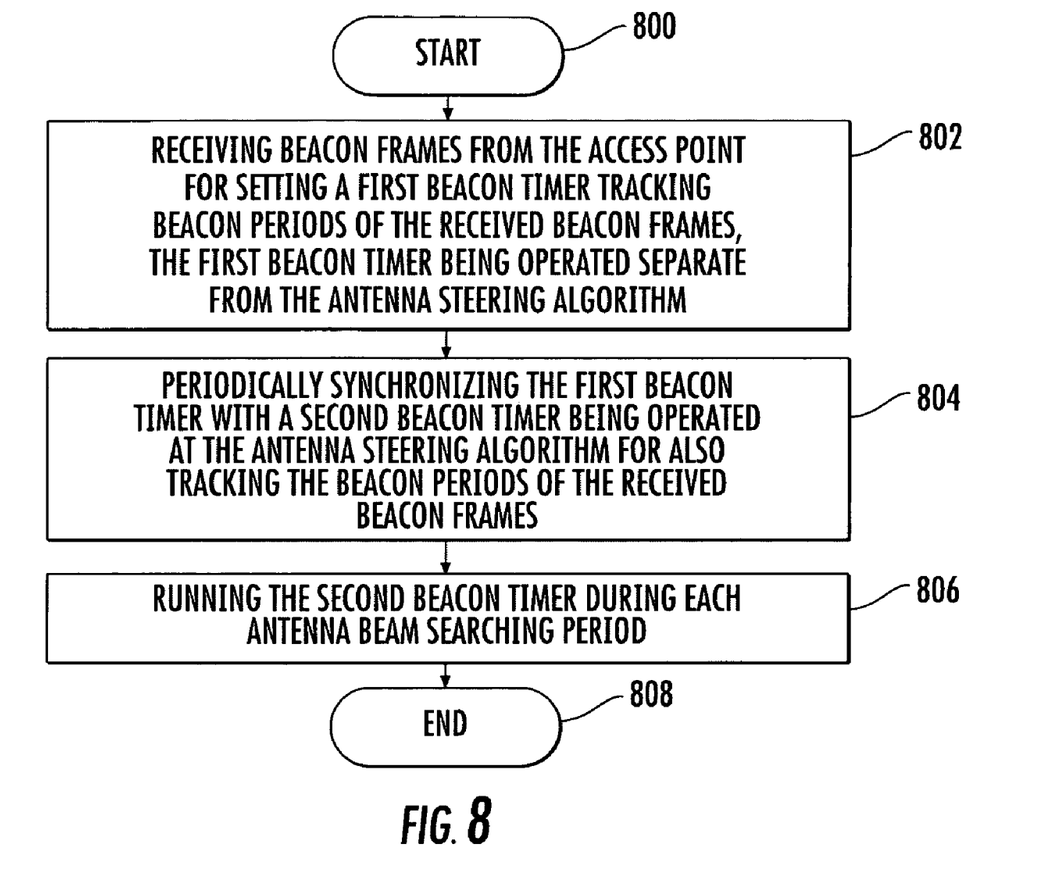
FIG. 8 is a flowchart for operating a smart antenna based upon a timer associated with the antenna steering algorithm layer in accordance with the present ivention.

Referring to the flowchart illustrated in FIG. 8, selecting antenna beams by the antenna steering algorithm in response to a timer maintained by the algorithm 18 will now be discussed. From the start (Block 800), the client station 14 receives beacon frames from the access point for setting a first beacon timer tracking beacon periods of the received beacon frames at Block 802. The first beacon timer is operated separate from the antenna steering algorithm 18. The first beacon timer is periodically synchronized with a second beacon timer at Block 804 that is operated at the antenna steering algorithm 18 for also tracking the beacon periods of the received beacon frames. The second beacon timer is run during each antenna beam searching period at Block 806. The method ends at Block 808.

Many modifications and other embodiments of the invention will come to the mind of one skilled in the art having the benefit of the teachings presented in the foregoing descriptions and the associated drawings. In addition, other features relating to smart antennas are disclosed in copending patent applications filed concurrently herewith and assigned to the assignee of the present invention and are entitled METHOD FOR STEERING SMART ANTENNA BEAMS FOR A WLAN USING MAC LAYER FUNCTIONS, attorney docket number 55362 (ITC-2-0969-01.US), METHOD FOR STEERING A SMART ANTENNA FOR A WLAN USING A SELF-MONITORED RE-SCAN, attorney docket number 55363 (ITC-2-0970.01.US), METHOD FOR STEERING A SMART ANTENNA FOR A WLAN USING A PERIODIC RE-SCAN, attorney docket number 55364 (ITC-2-0971.01.US), the entire disclosures of which are incorporated herein in their entirety by reference. Therefore, it is to be understood that the invention is not to be limited to the specific embodiments disclosed, and that modifications and embodiments are intended to be included within the scope of the appended claims.

That which is claimed is:

1. A method for operating a client station in a wireless local area network (WLAN) communication system comprising an access point, the client station comprising an antenna steering algorithm and a smart antenna responsive to the antenna steering algorithm for selecting one of a plurality of antenna beams, the method comprising:
   exchanging data with the access point using a first selected antenna beam;
   calculating a quality metric of the exchanged data for the first antenna beam, the calculating comprising
      determining at least one link quality metric (LQM) of the exchanged data for the first antenna beam,
      determining a signal quality metric (SQM) of the exchanged data for the first antenna beam, and
      combining the at least one LQM and the SQM for calculating the first quality metric;
   selecting at least one second antenna beam for exchanging data with the access point;
   calculating at least one second quality metric of the exchanged data for the at least one second antenna beam, the calculating comprising repeating the determining and combining for each second antenna beam;
   comparing the first quality metric to the at least one second quality metric; and
   selecting a preferred antenna beam from among the first antenna beam and the at least one second antenna beam for continuing to exchange data with the access point based upon the comparing.

2. A method according to claim 1 wherein the at least one LQM is based upon at least one estimate of a frame error rate (FER) of the exchanged data for the corresponding antenna beam.

3. A method according to claim 1 wherein the at least one LQM comprises a downlink LQM and an uplink LQM.

4. A method according no claim 3 wherein a weighting factor is used when combining the downlink LQM and the uplink LQM.

5. A method according to claim 3 wherein the client station comprises a media access control (MAC) layer including a plurality of frame counters for estimating frame error rates of the exchanged data; and wherein a first set of counters is used for determining the downlink LQM and a second sen of counters is used for determining the uplink LQM.

6. A method according to claim 5 wherein the first set of counters comprises a ReceivedFragmentCount counter, a MulticastFragmentCount counter, and a FCSErrorCount counter; and wherein the second set of counters comprises an ACKFailureCount counter and a TransmittedFrameCount counter.

7. A method according to claim 1 wherein the at least one LQM is based upon a transfer rate of the exchanged data for the corresponding antenna beam.

8. A method according to claim 1 wherein the at least one LQM is based upon at least one of a throughput and a data rate of the exchanged data for the corresponding antenna beam.

9. A method according to claim 1 wherein the SQM is based upon a received signal strength indicator (RSSI) of the exchanged data for the corresponding antenna beam.

10. A method according to claim 1 wherein a weighting factor is used when combining the LQM and the SQM.

11. A method according to claim 1 wherein the plurality of antenna beams comprise a plurality of directional beams and an omni-directional beam.

12. A method according to claim 1 wherein the WLAN comprises an 802.11 WLAN.

13. A client station for operating in a wireless local area network (WLAN) communication system comprising an access point, the client station comprising:
    a switched beam antenna for generating a plurality of antenna beams;
    a beam switching unit coupled to said switched beam antenna for selecting one of the plurality of antenna beams;
    a transceiver coupled to said beam switching unit for exchanging data with the access point via a selected antenna beam; and
    an antenna steering algorithm module for running an antenna steering algorithm for performing the following
        exchanging data between said transceiver and the access point using a first selected antenna beam,
        determining at least one link quality metric (LQM) of the exchanged data for the first selected antenna beam,
        determining a signal quality metric (SQM) of the exchanged data for the first selected antenna beam,
        calculating a first quality metric for the first selected antenna beam based upon a combination of the at least one LQM and the SQM,
        selecting at least one second antenna beam for exchanging data between said transceiver and the access point,
        repeating the determining for calculating at least one second quality metric for the at least one second antenna beam based upon a respective combination of the at least one LQM and the SQM associated therewith,
        comparing the first quality metric to the at least one second quality metric, and
    selecting a preferred antenna beam from among the first antenna beam and the at least one second antenna beam for continuing to exchange data with the access point based upon the comparing.

14. A client station according to claim 13 wherein the at least one LQM is based upon at least one estimate of a frame error rate (FER) of the exchanged data.

15. A client station according to claim 13 wherein the at least one LQM comprises a downlink LQM and an uplink LQM for the corresponding antenna beam.

16. A client station according to claim 15 wherein a weighting factor is used when combining the downlink LQM and the uplink LQM.

17. A client station according to claim 15 wherein the client station comprises a media access control (MAC) layer including a plurality of frame counters for estimating frame error rates of the exchanged data; and wherein a first set of counters is used for determining the downlink LQM and a second set of counters is used for determining the uplink LQM.

18. A client station according to claim 17 wherein the first set of counters comprises a ReceivedFragmentCount counter, a MulticastFragmentCount counter, and a FCSErrorCount counter; and wherein the second set of counters comprises an ACKFailureCount counter and a TransmittedFrameCount counter.

19. A client station according to claim 13 wherein the at least one LQM is based upon a transfer rate of the exchanged data for the corresponding antenna beam.

20. A client station according to claim 13 wherein the at least one LQM is based upon at least one of a throughput and a data rate of the exchanged data for the corresponding antenna beam.

21. A client station according to claim 13 wherein the SQM is based upon a received signal strength indicator (RSSI) of the exchanged data for the corresponding antenna beam.

22. A client station according to claim 13 wherein a weighting factor is used when combining the LQM and the SQM.

23. A client station according to claim 13 wherein the plurality of antenna beams comprise a plurality of directional beams and an omni-directional beam.

24. A client station according to claim 13 wherein the WLAN comprises an 802.11 WLAN.

* * * * *

UNITED STATES PATENT AND TRADEMARK OFFICE
CERTIFICATE OF CORRECTION

PATENT NO. : 7,236,759 B2
APPLICATION NO. : 11/080038
DATED : June 26, 2007
INVENTOR(S) : Inhyok Cha et al.

It is certified that error appears in the above-identified patent and that said Letters Patent is hereby corrected as shown below:

| | |
|---|---|
| Column 3, Line 19 | Delete: "present ivention." <br> Insert: --present invention-- |
| Column 3, Line 22 | Delete: "present ivention." <br> Insert: --present invention-- |
| Column 3, Line 25 | Delete: "present ivention." <br> Insert: --present invention-- |
| Column 5, Line 26 | Delete: "downlink MPDR" <br> Insert: --downlink MFDR-- |
| Column 6, Line 48 | Delete: "The weighting factor $\beta$ is less than 1." |
| Column 7, Line 51 | Delete: "in unit of Mbps," <br> Insert: --in units of Mbps,-- |
| Column 8, Line 46 | Delete: "calculating comprising" <br> Insert: --calculating comprises-- |
| Column 9, Line 8 | Delete: "of anyone" <br> Insert: --of any one-- |
| Column 9, Line 36 | Delete: "re-scan wil" <br> Insert: --re-scan will-- |

UNITED STATES PATENT AND TRADEMARK OFFICE
CERTIFICATE OF CORRECTION

PATENT NO. : 7,236,759 B2
APPLICATION NO. : 11/080038
DATED : June 26, 2007
INVENTOR(S) : Inhyok Cha et al.

It is certified that error appears in the above-identified patent and that said Letters Patent is hereby corrected as shown below:

Column 10, Line 22   Delete: "just needs know"
                     Insert: --just needs to know--

Column 10, Line 48   Delete: "The $S_{SCANNINGN\_STATUS}$"
                     Insert: --The $S_{SCANNING\_STATUS}$--

Column 14, Line 50   Delete: "second sen"
                     Insert: --second set--

Signed and Sealed this

Thirtieth Day of September, 2008

JON W. DUDAS
*Director of the United States Patent and Trademark Office*